(12) United States Patent
Paratore et al.

(10) Patent No.: US 7,884,811 B2
(45) Date of Patent: Feb. 8, 2011

(54) DURABLE DIGITAL WRITING AND SKETCHING INSTRUMENT

(75) Inventors: Robert M. Paratore, Redmond, WA (US); Scott Lind, Woodinville, WA (US); David McGee, Bainbridge Island, WA (US)

(73) Assignee: Adapx Inc., Seattle, WA (US)

( * ) Notice: Subject to any disclaimer, the term of this patent is extended or adjusted under 35 U.S.C. 154(b) by 0 days.

(21) Appl. No.: 11/751,544

(22) Filed: May 21, 2007

(65) Prior Publication Data

US 2007/0268278 A1    Nov. 22, 2007

Related U.S. Application Data

(60) Provisional application No. 60/917,034, filed on May 9, 2007, provisional application No. 60/892,500, filed on Mar. 1, 2007, provisional application No. 60/870,601, filed on Dec. 18, 2006, provisional application No. 60/869,093, filed on Dec. 7, 2006, provisional application No. 60/868,717, filed on Dec. 5, 2006, provisional application No. 60/829,520, filed on Oct. 13, 2006, provisional application No. 60/802,830, filed on May 22, 2006.

(51) Int. Cl.
*G06F 3/033* (2006.01)
(52) U.S. Cl. .................... 345/179; 178/19.01
(58) Field of Classification Search ........ 345/156, 345/179; 178/18.01, 19.01, 18.09
See application file for complete search history.

(56) References Cited

U.S. PATENT DOCUMENTS 2,168,918 A   8/1939 Spitalny
4,131,880 A   12/1978 Siy et al.
5,410,334 A   4/1995 Comerford (Continued)

FOREIGN PATENT DOCUMENTS

WO    2008070724    6/2008

(Continued)

*Primary Examiner*—Stephen G Sherman
(74) *Attorney, Agent, or Firm*—Black Lowe & Graham PLLC

(57) ABSTRACT

A hand-holdable, durable digital writing and sketching device or assembly having rugged construction that houses an on-board camera with a view through an optical window of a writing surface brought in view by a user moving the device. The device is rugged, sealed, and is capable of withstanding dropping, water submersion, abrasive incursions, and resistance to chemical and fungal degradation. The optical window and optic channel to the camera is protected by a durable and replaceable light-transmitting shield that provides a sealed barrier to the environmental elements harmful to the functioning of the device. The writing and sketching device oscillates between a stowed and a deployed state. The deployed state includes the camera being in view the writing surface and the stowed state includes the camera being either masked from viewing the writing surface or aimed internally from viewing the writing surface. Other versions of the digital writing and sketching device include replaceable styli and pens that are removable and interchangeable with a sealed chamber in the device. The stylus point or pen ends are substantially in view of the on-board device camera. Signal transmissions communicated from the digital writing and sketching device convey pressures experienced by the inserted stylus or pens and are represented in proportion to a microprocessor based display that conveys changing field of view experienced by the on-board camera.

9 Claims, 11 Drawing Sheets

U.S. PATENT DOCUMENTS

| | | | |
|---|---|---|---|
| 5,652,412 | A | 7/1997 | Lazzouni et al. |
| 5,661,506 | A | 8/1997 | Lazzouni et al. |
| 6,056,118 | A | 5/2000 | Hargus et al. |
| 6,084,577 | A | 7/2000 | Sato et al. |
| 6,104,388 | A | 8/2000 | Nagai et al. |
| 6,130,666 | A | 10/2000 | Persidsky |
| 6,188,392 | B1 | 2/2001 | O'Connor et al. |
| 6,310,988 | B1 | 10/2001 | Flores et al. |
| 6,344,848 | B1 * | 2/2002 | Rowe et al. ............. 345/179 |
| 6,422,775 | B1 | 7/2002 | Bramlett et al. |
| 6,503,085 | B1 | 1/2003 | Elkind |
| 6,573,887 | B1 | 6/2003 | O'Donnell, Jr. |
| 6,592,039 | B1 | 7/2003 | Smith et al. |
| 6,627,870 | B1 | 9/2003 | Lapstun et al. |
| 6,650,320 | B1 | 11/2003 | Zimmerman |
| 6,686,910 | B2 | 2/2004 | O'Donnell, Jr. |
| 6,806,868 | B2 | 10/2004 | Chuang |
| 6,832,116 | B1 | 12/2004 | Tillgren et al. |
| 6,985,138 | B2 | 1/2006 | Charlier |
| 7,010,147 | B2 | 3/2006 | Silverbrook et al. |
| 7,013,029 | B2 | 3/2006 | Keskar et al. |
| 7,015,901 | B2 | 3/2006 | Lapstun et al. |
| 7,126,590 | B2 | 10/2006 | Jelinek et al. |
| 7,167,164 | B2 | 1/2007 | Ericson et al. |
| 7,176,906 | B2 | 2/2007 | Williams et al. |
| 7,203,384 | B2 | 4/2007 | Carl |
| 7,231,181 | B2 * | 6/2007 | Kohli et al. ............. 455/41.2 |
| 7,239,306 | B2 | 7/2007 | Fabraeus et al. |
| 7,342,575 | B1 * | 3/2008 | Hartwell et al. ........... 345/179 |
| 2003/0112623 | A1 * | 6/2003 | Yu et al. ............... 362/118 |
| 2004/0217021 | A1 | 11/2004 | Chao |
| 2005/0030297 | A1 | 2/2005 | Burstrom et al. |
| 2006/0028458 | A1 * | 2/2006 | King et al. ............. 345/179 |
| 2006/0109262 | A1 * | 5/2006 | Yeh ..................... 345/179 |
| 2006/0189903 | A1 | 8/2006 | Poreh et al. |
| 2007/0160971 | A1 | 7/2007 | Caldera et al. |
| 2007/0299360 | A1 | 12/2007 | Snyder et al. |

FOREIGN PATENT DOCUMENTS

| | | |
|---|---|---|
| WO | 2009149110 | 12/2009 |

* cited by examiner

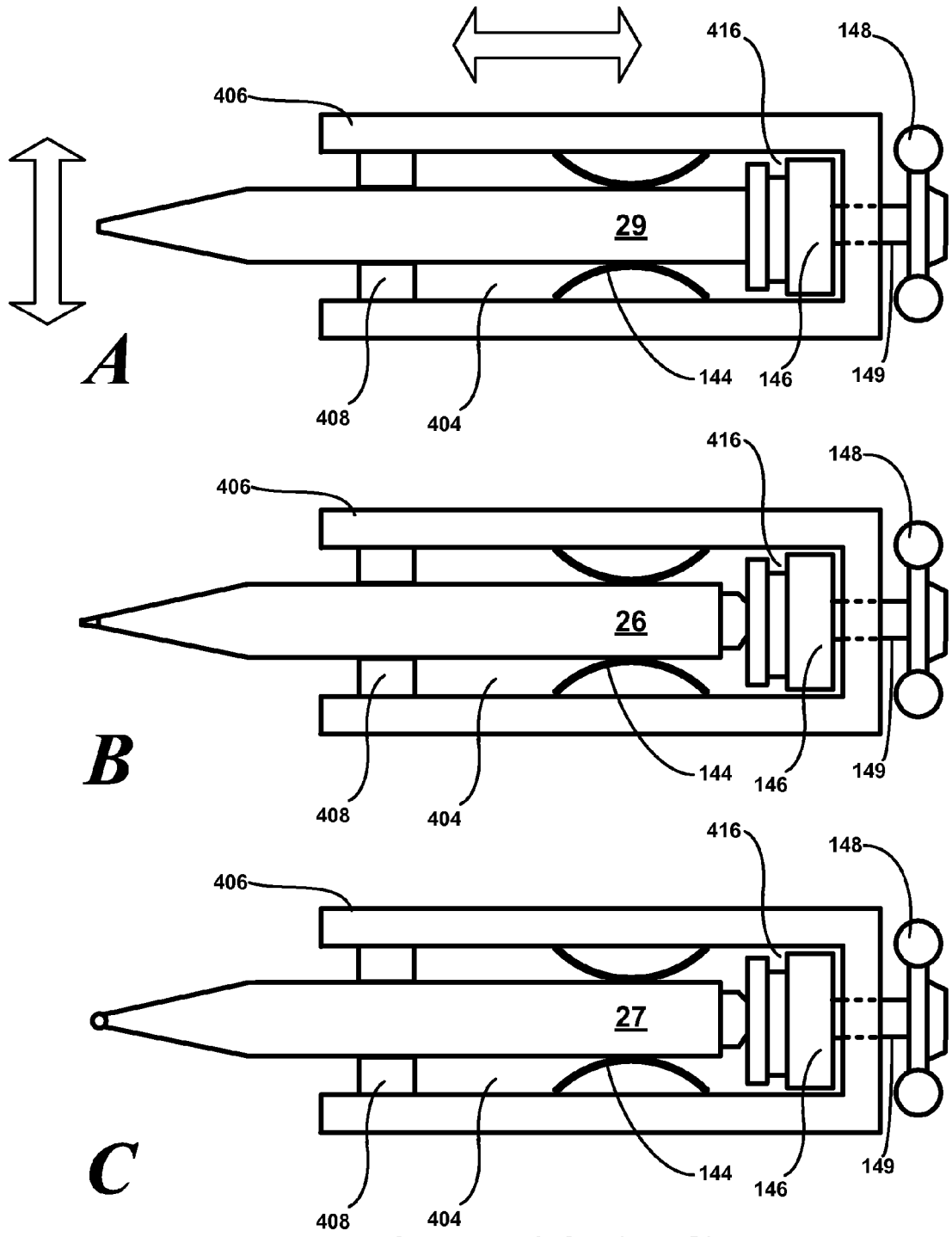
Figs. 13A-C

DURABLE DIGITAL WRITING AND SKETCHING INSTRUMENT

RELATED APPLICATIONS

This application claims priority to and incorporates by reference in its entirety U.S. Patent Provisional Application Ser. No. 60/917,034 filed May 9, 2007.

This application claims priority to and incorporates by reference in its entirety U.S. Patent Provisional Application Ser. No. 60/892,500 filed Mar. 1, 2007.

This application claims priority to and incorporates by reference in its entirety U.S. Patent Provisional Application Ser. No. 60/870,601 filed Dec. 18, 2006.

This application claims priority to and incorporates by reference in its entirety U.S. Patent Provisional Application Ser. No. 60/869,093 filed Dec. 7, 2006.

This application claims priority to and incorporates by reference in its entirety U.S. Patent Provisional Application Ser. No. 60/868,717 filed Dec. 5, 2006.

This application claims priority to and incorporates by reference in its entirety U.S. Patent Provisional Application Ser. No. 60/829,520 filed Oct. 13, 2006.

This application claims priority to and incorporates by reference in its entirety U.S. Patent Provisional Application Ser. No. 60/802,830 filed May 22, 2006.

COPYRIGHT NOTICE

This disclosure is protected under United States and International Copyright Laws. © 2007 Adapx. All Rights Reserved. A portion of the disclosure of this patent document contains material which is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyright rights whatsoever.

FIELD OF THE INVENTION

This application relates to digital based scanners.

BACKGROUND OF THE INVENTION

It can be appreciated that digital pen devices have been in use for years. Typically, a digital pen is comprised of products such as the Maxell Penit, the Nokia SU-B1, the Leapfrog Fly, the C Technologies C-Pen, and the Logitech io™ pen products. The main problem with these conventional digital pens is that these products are designed for the consumer market and therefore, they are not rugged enough to survive harsh external environmental conditions or harsh user abuse. Another problem with conventional digital pen computers is that the ink used in these devices has been designed such that it can only write on certain limited paper stocks under normal working office temperature conditions, and the pens are have limited durability and subject to breakage.

There is a need for a non-fragile pen that is not limited to normal writing surfaces, standard environmental operating conditions, and normal operator handling.

SUMMARY OF THE PARTICULAR EMBODIMENTS

A hand-holdable, durable digital writing and sketching device or assembly having rugged construction that houses an on-board camera with a view through an optical window of a writing surface brought in view by a user moving the device. The device is rugged, sealed, and is capable of withstanding dropping, water submersion, abrasive incursions, and resistance to chemical and fungal degradation. The optical window and optic channel to the camera is protected by a durable and replaceable light-transmitting shield that provides a sealed barrier to the environmental elements harmful to the functioning of the device. The writing and sketching device oscillates between a stowed and a deployed state. The deployed state includes the camera being in view of the writing surface and the stowed state includes the camera being either masked from viewing the writing surface or aimed internally from viewing the writing surface. Other versions of the digital writing and sketching device include replaceable styli and pens that are removable and interchangeable with a sealed chamber in the device. The stylus point or ink refill tips, both being pen tips, are substantially in view of the on-board device camera. Signal transmissions communicated from the digital writing and sketching device convey pressures experienced by the inserted stylus or pens and are represented in proportion to a microprocessor based display that conveys a changing field of view experienced by the on-board camera as it is made to scan the writing surface.

BRIEF DESCRIPTION OF THE DRAWINGS

Embodiments of the present invention are described in detail below with reference to the following drawings.

FIGS. 13A-C schematically illustrates in cross-section details of the stylus chamber 404 of digital pen 400 of FIG. 13.

DETAILED DESCRIPTION OF THE PARTICULAR EMBODIMENTS

Figure 1:
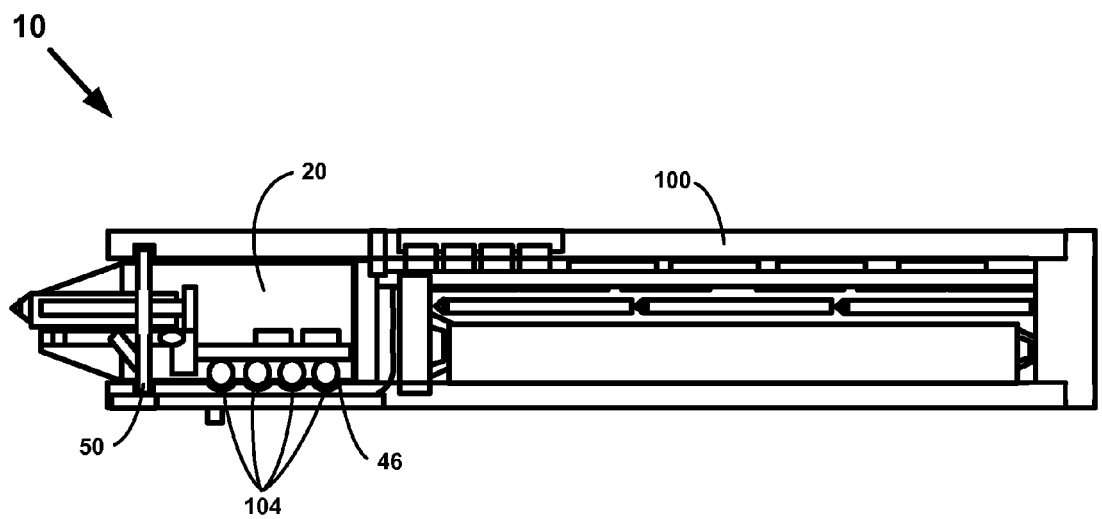
FIG. 1 illustrates a durable digital pen assembly in a deployed state showing a digital pen section extending from a pen-holding cap section.

A digital writing and sketching device or assembly having rugged construction to withstand dropping and water submersion in a sealed, non-operational or stowed state and be resistant to water caused degradation and grit or sand incursion and abrasion in an operational or deployed state. The writing and sketching device or assembly may include two active subsections that oscillate between a stowed state and a deployed state. The deployed state includes a camera configured to view a writing surface as made visible by hand movements of a user holding the digital writing and sketching device. The stowed state includes the camera being either masked from viewing the writing surface or aimed internally from viewing the writing surface. Other versions of the digital writing and sketching device include replaceable styli and pen ink refills that are removable and interchangeable with a sealed chamber. The points of pen ends of the styli and pen ink refills (i.e., pen tips) are substantially in camera view of the digital writing and sketching device. Signal transmissions communicated from the digital writing and sketching device convey pressures experienced by the inserted stylus or pen ink refills and are represented in proportion to a microprocessor based display.

In the operational state the digital pen employs optics with protective, light-transmitting replaceable shields and associated electronics in communication with the optics to perform image capture of user writing or sketching onto surfaces. Microprocessors operating within the digital pen interpret information from the surface and associate time and/or spatial data with the interpreted information. Such surfaces may or may not include a dot pattern. Other versions of the digital pen include compartmentalized sections that detachably re-attachable between a stowed and deployed state and constructed of casing materials that are fungal and impact resistant and stable against corrosive inorganic and organic solutions. Sections of the digital pen include components that are similarly detachably re-attachable. Re-attached components or re-attached sections are firmly interconnected with secure sealing parts to permit operation by a user under stressful environmental conditions and to withstand dropping and water submersion in the stowed state.

In pen based embodiments, the stowed state of the device occurs when the pen tip of a sealed and replaceable ink cartridge and adjacent optics window facing inward in a non-writable and non-viewing surface position, and the deployed state when the roller ball or felt pen tip of the ink cartridge faces outward in a writable position and the optic window having a view of the writing surface. Alternatively, the digital pen device may have all functional components in a fixed position with the pen tip facing outward in the writable position, but shielded by a removable and re-attachable cover that also includes circuitry to activate or deactivate the digital pen depending on whether the cover is attached to the digital pen or removed. In both embodiments the casing of the active subsections and cover comprise rugged construction to withstand dropping and water submersion in a sealed, non-operational or stowed state and be resistant to water caused degradation and grit or sand incursion and abrasion in the operational state.

The digital pen device or assembly may include two active subsections that oscillate between a stowed state of a sealed and replaceable ink cartridge and adjacent optics window facing inward in a non-writable and non-viewing surface position, or with the ink cartridge facing outward in a writable position the optic window in a writing surface viewing position. Alternatively, the digital pen device may have all functional components in a fixed position with the roller ball facing outward in the writable position, but shielded by a removable and re-attachable cover that also includes circuitry to activate or deactivate the digital pen depending on whether the cover is attached to the digital pen or removed. In both embodiments the casing of the active subsections and cover comprise rugged construction to withstand dropping and water submersion in a sealed, non-operational or stowed state and be resistant to water caused degradation and grit or sand incursion and abrasion in the operational state. In the operational state the digital pen employs optics with protective, light-transmitting replaceable shields and associated electronics in communication with the optics to perform image capture of user writing or sketching onto surfaces in the form of infrared dot patterns. Microprocessors operating within the digital pen interpret information from the writing surface and associate time and/or geographic data with the interpreted information. Other versions of the digital pen include compartmentalized sections that detachably re-attachable between a stowed and deployed state and constructed of casing materials that are fungal and impact resistant and stable against corrosive inorganic and organic solutions. Sections of the digital pen include components that are similarly detachably re-attachable. Re-attached components or re-attached sections are firmly interconnected with secure sealing parts to permit operation by a user under stressful environmental conditions and to withstand dropping and water submersion.

The digital pen device provides computer-processing features configured to perform different but complementary functions by sectional members. The digital pen performs an image capture surface information to produce time and point information that is interpretable by computer software to link the time and point information to specific data on predefined maps, text or images. The digital pen provides a robust, environmentally protective package that enables the electronic functions of the pen sealed electronic circuitry to ensure operation under harsh environment scenarios. The delicate optics are packaged in a protective enclosure.

The sectional members of the digital pen-computing device include a pen section and a cap section. Both sectional members are configured to generate, store, and convey writing information and location information to a computer and/or computer network under harsh conditions. The digital pen-computing device is rugged or robustly engineered to allow writing on multiple surfaces such as certain paper, glass or plastic laminates. The digital pen is capable of surviving harsh user abuse environments as well as extreme external environmental conditions, including sealing against rain, dust, sand particles and water ingress. The digital pen device includes 1. a rugged and inexpensive pen section; 2. A rugged Cap section that provides operational and non-operational protections from harsh environments; and optionally 3, a rugged dock configured to charge spare batteries.

The pen section encompasses an imaging optics platform, ink cartridge and decode circuitry with a serial interface to the main electronics located in the Cap. It also contains features to provide sealing against rain, dust, sand particles and water ingress.

The cap section encompasses the needed circuitry to receive decoded or raw image data, pen up/down and timing data from the pen section, and a serial interface to bi-directionally communicate with the pen section and/or the dock section. The communications interface includes protocol definitions to transfer the above-mentioned functionality and any optionally advantageous reset and synchronization signaling to the pen section. Other embodiments provide for wireless interfacing or communication between the pen and cap sections.

The digital pen assembly provides a protective package for the electronic functions of the device by careful and inventive platform interconnection techniques and mechanical design that provide sealing and circuitry to ensure harsh environment operations. An additional benefit of the architecture of the device is that the delicate optics are packaged in an inexpensive protective enclosure that may be considered disposable as compared to standard state of the art digital pen designs that incorporate all the expensive electronics in a single package. Particular embodiments relate generally to a durable digital pen computer device having sufficient ruggedness to operate within harsh environmental conditions, to write upon multiple and diverse surfaces, and to withstand temperature, moisture, and user handling extremes. Signal information of captured dot patterns are conveyed to a computer based devices configured with software to interpret from the dot pattern based signal information to produce time and/or point information to specific location data on predefined stored maps, text or images. The diverse surfaces include normal flat sheet like paper, and more optionally advantageously, glass, laminates, and textured papers. Other particular embodiments of the durable digital pen computer device include an external pen case packaging designed to make the digital pen associated electronics and optics capable of surviving harsh external environmental extremes, temperature extremes, have sufficient water resistance, resilience to dust and sand incursions, and possess sufficient durability to survive harsh operator handling, including water submersion and dropping on hard surfaces.

In general, particular embodiments are more described with reference to FIGS. 1-11 below. Illustrated are digital pen assembly sectionally configured to separate and reassemble between a deployed or operational state and a non-operational or stowed state. Associated electro optics are housed in a protective package that is durably robust to withstand environmental extremes. The pen and associated electronics may separately reside in different sections and are configured to sealably intermesh between the deployed and stowed states. Inks in the digital pen are formulated for delivery and to adhere to paper, textured paper, glass, and/or laminates under low, normal, and high temperatures. Other versions of the rugged digital pen utilize replaceable optical window shields that are light-transmittable to prevent scratching of underlying optical surfaces.

Figure 10A:
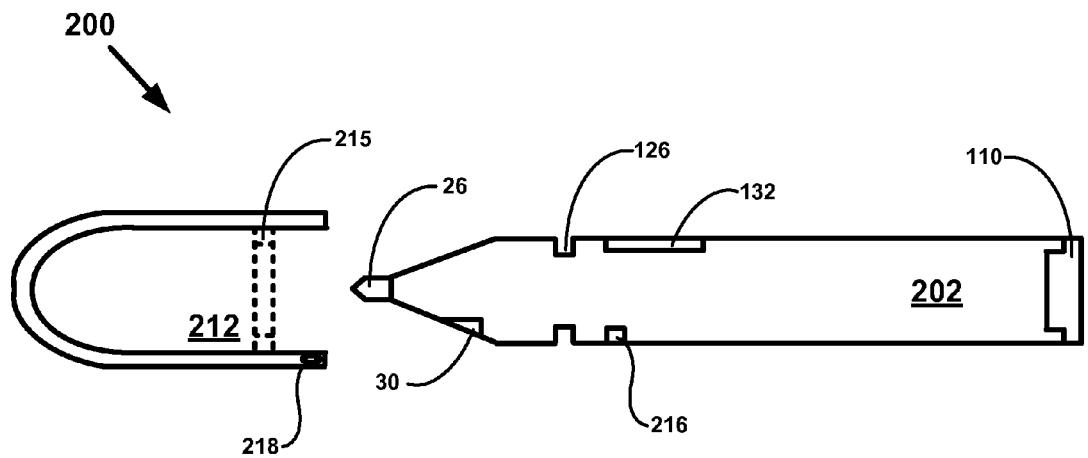
FIG. 10A schematically illustrates in partial cross-section an alternate embodiment of the digital pen.

FIG. 1 illustrates a durable digital pen assembly 10 in a deployed state showing a digital pen section 20 or member extending from a pen-holding cap section 100 or member. The digital pen section 20 is held within the cap section 100 by O-ring 54. Signal communication between the digital pen section 20 and the cap section 100 is achieved by conductive engagement of pen electrical contacts 46 and cap electrical contacts 104. The durable pen assembly 10 allows for protection in harsh environments and to write on various surfaces such as glass, laminates and certain textured paper. The sectional design of the digital pen assembly 10 allows for changeable pen part types as well as allowing inexpensive disposal. The pen section 20 may be removably engaged with a barrel or cavity region of the cap section 100 as described below. The mechanical and optics design of the pen section is structurally configured to provide sealing against rain, dust, sand particles and water incursions as described below. Alternate embodiments of the pen section 20 and cap section 100 may respectively house a Hall switch and magnet as illustrated in FIG. 10A below. The Hall switch may be located in the pen section 20 and magnet located in the cap section 100, or vice versa, installed and cooperatively connected with the pen 20 and cap section 100 electronics in such a matter that activates the digital pen 10 during the deployed state and deactivates the digital pen 10 during the stowed state. Activation may be signaled by a vibrating motor and/or flashing LED lights sensed by the user.

Figure 2:
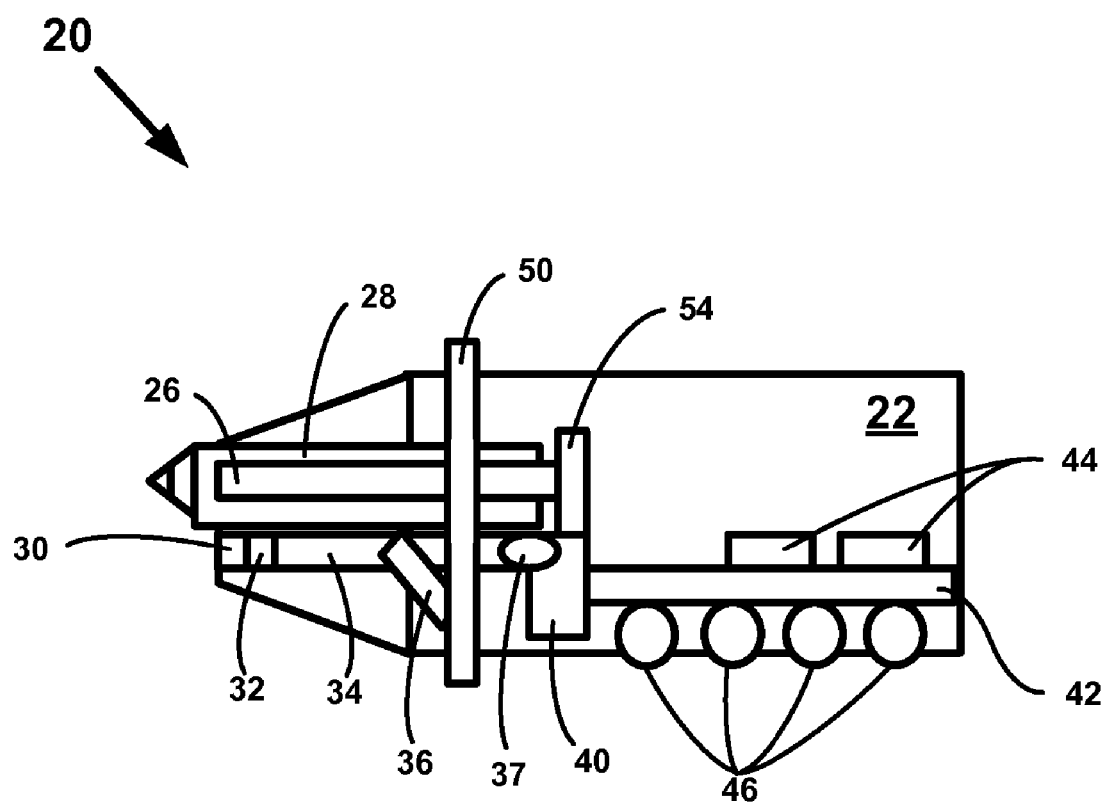
FIG. 2 schematically illustrates in cross-section the digital pen section and components therein.

FIG. 2 schematically illustrates in cross-section the digital pen section and 20 components therein of the digital pen assembly 10 of FIG. 1. The digital pen section 10 includes an imaging optics platform that complementarily works with a sealed, interchangeable ink cartridge 26 that is housed within a pen cavity 28. The optics platform includes an illumination light pipe having an infra red (IR) filter 30, a lens 32, an optics channel 34, a mirror 36, an IR light source 38, and a charge coupled device (CCD) or other camera 40. Signals from the CCD 40 are conveyed by electrical contacts 42 to integrated circuits 44. The integrated circuits 44 include an image decode circuit (not shown) and a serial communications circuit (not shown). The digital pen section 20 further includes a serial interface (not shown) and a protected contact array 46 in coordinated communication via the cap electrical contacts 104 with the main electronics circuitry located in the cap section 100. The pen section 20 includes an O-ring 50 to provide sealing against rain, dust, sand particles and water ingress. The replaceable and interchangeable ink cartridge 26 is in mechanical contact with a strain gauge 54 that serves as an activation switch. In alternate embodiments, sources other than infra red light may be used, along with filters appropriate for the wavelength of light emanating from the light source.

The CCD image element 40 may provide a dot resolution approximately 10 µm for CCD illumination, similar to that provided by Everlight Electronics' (Taipei, Taiwan) LED model HIR204C. The IR light source 38 may include the LED having an illumination at approximately 850 nm wavelength. The mirror 36 provides a path that directs the IR LED illumination from the IR LED 38 and captures the illumination back to the CCD element 40 for optimal dot recognition. The writing element of the pen part encompasses the replaceable and interchangeable ink cartridge 26 that is configured to write on certain papers, glass or plastic laminates. This ink is within the cartridge 26 may be water resistant and may be IR transmissible. The ink may also be usable in temperatures of ranging approximately between 0° F. and approximately 120° F. Additionally, the ink may function if uncapped for several hours in temperature from approximately 0° F. to approximately +155° F. The strain gauge 54 may activate upon camera optics upon commencement of writing. Alternatively, camera optics may be activated by a micro switch placed in contact with the rearward section of the ink cartridge 26 when the switch is configured to active with a force of about 20± about 10 grams.

The tip region of the digital pen section 20 exhibits resistance to deformation such that the focal length change does not affect the optionally advantageous dot resolution perceived at the CCD element. Additionally, the tip region is scratch resistant from sand and dust. The tip region may be removable and replaceable without using external tools. The removal of the tip and replacement will not alter the seal integrity around the tip significantly. The pen section 20 also includes contacts used for serial interface communication and to receive electrical power from the cap section 100. The pen section 20 may also include a locking mechanism for the firm securing of the pen 20 to cap 100 and pen 20 or cap to dock 130 as discussed below. The locking mechanism provides positive, fail-safe latching, as well as providing feedback to the user that the pen section 20 is locked and ready to use. The barrel case 22 of the digital pen 20 is designed to ergonomically fit into a user's hand (left or right) in substantially a single position. The shell or casing of the pen section 20 and/or the cap section 100 may be constructed of durable materials including plastic composites, metals, metal alloys, and plastic metal composites. Plastic composites materials may include matted non-glare finishes to allow a rubber-like non-slip sleeve for gluing or bonding. Engageable regions between the pen section 20, the cap section 100, or portions thereof that integrate of slidably and sealably engage with, for example the insertable ink cartridge 26 and the battery cap 110, allows a threaded or friction assembly with O-rings for waterproof and pressure resistant seal. These sealable techniques allow for a secured and sealed electronics in a durable plastic assembly that slidably engages with each matching components. The pen section 20 may also be sealed against salt or fresh water ingress to a depth of approximately 2 meters and withstand rain having droplet-sizes of approximately 2 to approximately 4.5 mm at a pressure of approximately 40 lbs./in$^2$. The lens 32 may be adjustable to the focal length to achieve the proper dot resolution at the CCD element 40. Other embodiments of this design may provide for variable focal length adjustments such that depth of field can be varied. The lens 32 may exhibit minimal deformation or discoloration over the operational and non-operation temperature specification for the assembly 10. The IR filter 30 may also scratch resistant to dust and sand. Additionally, the IR filter 30 may be sealed against salt or fresh water ingress to a depth of approximately 2 meters and similarly withstand rain droplet-sizes of approximately 2 to approximately 4.5 mm at a pressure of approximately 40 lbs./in$^2$.

Figure 3:
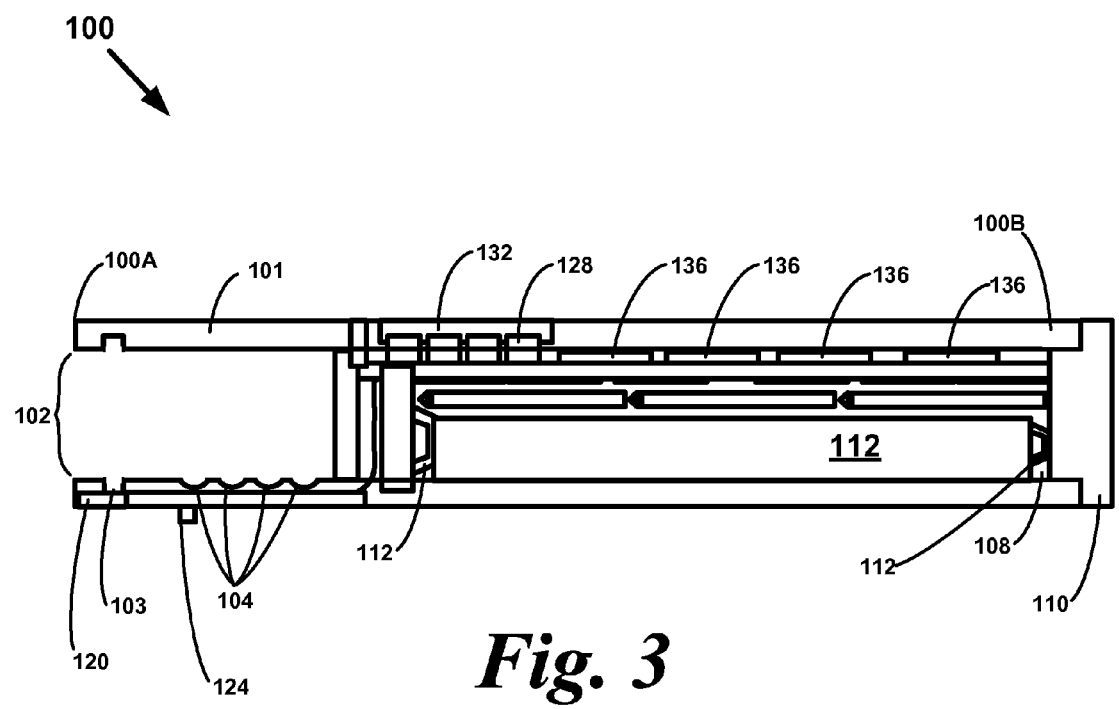
FIG. 3 schematically illustrates in cross-section the cap section of the digital pen assembly.

FIG. 3 schematically illustrates in cross-section the cap section 100 of the digital pen assembly 10 of FIG. 1. The cap 100 section contains a pen end 100A and a back end 100B. The cap section 100 enables the operational and non-operational modes of the digital pen assembly 10 and is similarly configured to work in harsh conditions. The cap section 100 includes a housing 101 with a cavity 102 near the pen end 100A to receive the pen section 20. The caps section 102 includes a slot 103 to cooperatively and removeably engage the O-ring 50 of the digital pen member 20 to secure the digital pen member 20 within the cap cavity 102 of the cap section 100. The cap section 102 also includes the cap section contacts 104 to removeably engage the pen section contacts 46 to receive and transmit signals between the cap section 100 and to receive power from the cap section 100. The cap section 100 also includes a battery compartment 108 opening from the back end 100B that houses a battery engaging battery contacts 112 to power the electronics and electro optics of the pen section 20 and caps section 100. A battery cap 110 closes the battery compartment 108. Residing in the battery compartment 108 are spare pen and ink cartridges 26.

The cap section 100 removeably interfaces with the pen section 20 and via the contact array 104 to establish and maintain bi-directional communication with the pen section 20. The bi-directional communication involves circuitry to receive decoded and/or raw image data from the CCD 40, circuitry that signals the pen up/down status, and circuitry that provides timing data from the pen section 20. The communications interface includes protocol definitions to transfer the above-mentioned functionality and any optionally advantageous reset and synchronization signaling to the pen section 20. The cap section 100 also provides power to the pen section 20. Alternate embodiments for the cap section 100 circuitry advantageously provides methods for data storage, radio and/or voice interfaces, and an operating system capability to support device driver expansions in communication with standalone personal computers or via communication with other computers via a local network or the Internet.

Near the external side of the cap cavity 102 is an optional cap light source 120. The cap light source 120 may include a light emitting diode (LED). Adjacent to the LED 120 is a sealed LED illumination switch 124.

The cap section 100 encompasses circuitry to receive raw or decoded camera data, pen up/down condition information and timing data from the pen section. The cap 100 section contains a pen end 100A and a back end 100B. Located at the pen end 100A of the cap section 20 are the cap contacts 104 that encompass a serial interface that may include a 2 wire interface with a transfer speed in excess of 450 kbps providing a have bi-directional flow control and if possible allow for master/slave control functionality to the pen section. The communications interface includes protocol definitions to transfer the above mentioned functionality and any optionally advantageous reset and synchronization signaling to the pen section. Power is also provided on this serial interface contact via another 2 wire contact that delivers approximately 1.5 volts battery power to the pen section.

Still referring to FIG. 3, the pen end 100A of the cap section 20 provides a locking mechanism of the pen section 20 to the cap section 100 to provide a positive, fail-safe lock or engagement. This locking or engagement provides feedback to the user (positive click or seeing a small button or lever in or out of position) that the pen assembly 10 is locked and ready to use. The lock provides a snug watertight fit. Particular embodiments provide a watertight fit secure enough to sustain an exposure to approximately a 3-meter depth in salt and/or fresh water. The fitting mechanism may include a detent mechanism (not shown) to accept the pen section 20 o-ring mechanism. The cap section 100 pen end 100A includes the illumination LED 120 and the sealed switch 124 to provide a high power red LED for illumination to enabling writing and reading in dark places, and to provide path illumination or for signaling purposes.

The cap section back end 100B provides an LED panel 128 and an LED lens cover 132 that does not compromise the sealing of the unit. Also located in the cap section back end 100B are electronics comprised of a micro processors 136 capable of running a real time operating system (RTOS) expandable to Tiny Linux, Linux, Windows, or Macintosh operating systems and to provide flash memory for data and program storage for the cap section 100. The back end 100B of the cap section holds the single battery 114 with accompanied electronics that provide circuitry and logic for fielding variety of user replaceable battery types operating at 1.5 volts. These battery may encompass ant not be limited to AAA sizes and may include in compartment 108 rechargeable Lithium Ion, externally charged Lithium Ion Batteries, and non-rechargeable alkaline or carbon zinc batteries. The cap section back end 100B also contains the battery cap 110 so that the battery shall be user accessible via an o-ring receptacle hand rotatable by the user to replace or remove a spent battery 114 and obtain access to spare or interchangeable pen tips 26. The screw retention cap 110 may also include a slotted center to facilitate removal or tightening with a feature built into the pen part case or coin. The pen tips 26 housed in the battery compartment 108 may be different types—i.e. different ink types, colors or non-writing stylus tips. The cap section case 101 sealing elements provide sealing against salt or fresh water ingress to a depth of approximately 2 meters, rain droplet-size of approximately 2 to 4.5 mm at a pressure of approximately 40 lbs./in$^2$ as well as ingress from sand and dust particles.

Figure 4:
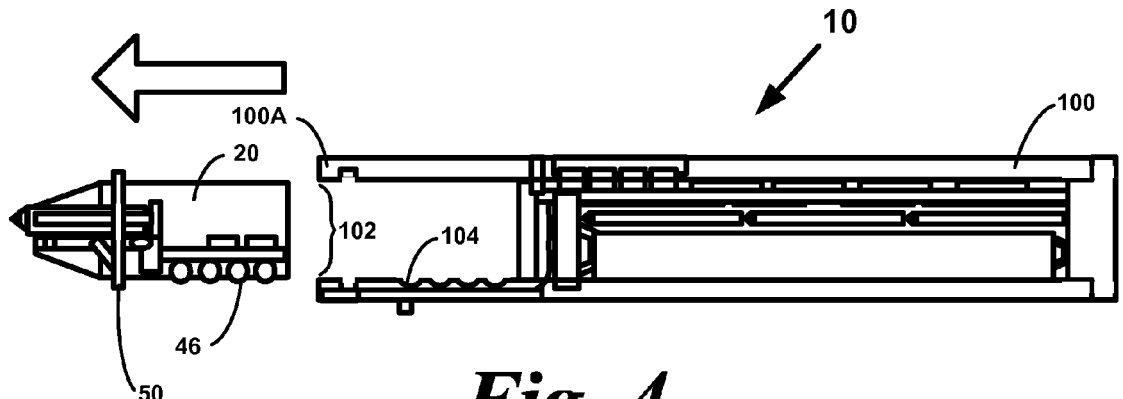
FIG. 4 schematically illustrates in cross-section the operational mode of the digital pen assembly being removed from the cap section.

FIG. 4 schematically illustrates in cross-section the operational mode of the digital pen assembly being removed from the cap section. The O-ring 50 and pen contacts 24 easily disengage from the respective slot 103 and cap contacts 104 within the cap cavity 102 located near the cap end 100A of the cap section 100.

Figure 5A:
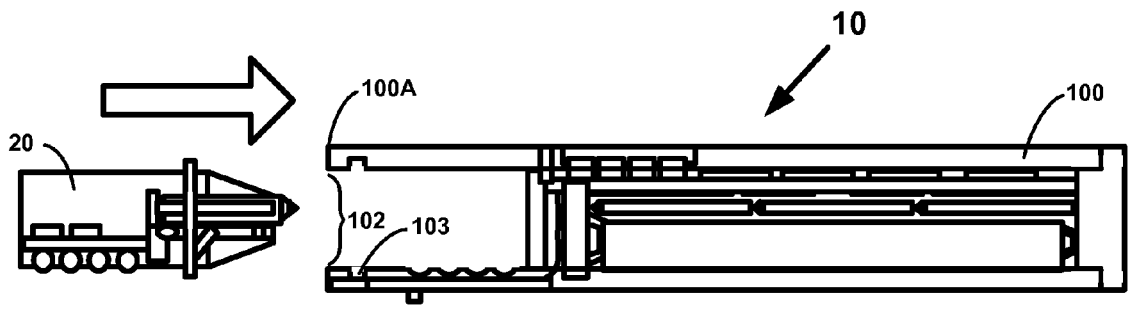
FIG. 5A schematically illustrates in cross-section the digital cap section being placed into a non-operational or stowage mode of the digital pen assembly.

FIG. 5A schematically illustrates in cross-section the digital cap section being placed into a non-operational or stowage mode of the digital pen assembly. Here the pointed end of the pen section 20 partially occupies and is secureably held within the cap cavity 102 via engagement of the pen O-ring 50 with the cap section 100's slot 103.

Figure 5B:
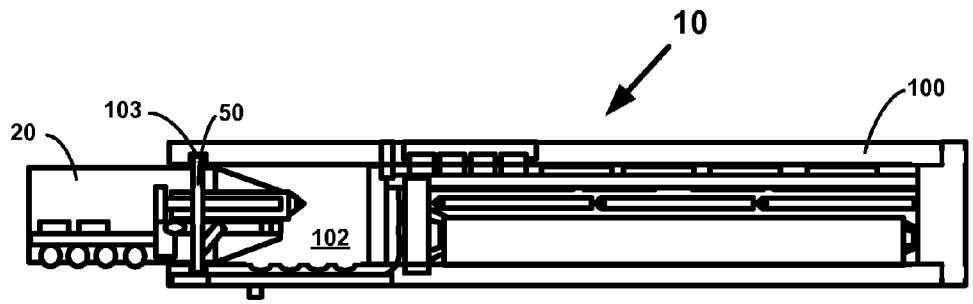
FIG. 5B schematically illustrates in cross-section the digital pen assembly placed in a stowed stowage mode.

FIG. 5B schematically illustrates in cross-section the digital pen assembly placed in a stowed or non-operational mode. The pointed region or pointed end of the pen section 20 slidably and sealably engages into the receiving cavity 102 of the cap section 100. Sealably engagement of the O-ring 50 with the respective slot 103 is enhanced by the plastic composite materials used in the construction of the pen and slot sections 20 and 100. The plastic composite materials impart a rubberized gripping friction action of the surface of the slot 103 with the surface of the rubbery O-ring 50 so that watertight, firm sealing is established.

Impact resistance is conferred upon the plastic composites in those formulations in which a rubber like bumper with structural reinforcements (not shown) may be optionally configured into the casework of the pen and cap sections 20 and 100. The contacting surfaces between the pen and cap sections 20 and 100 may be complementarily threaded and be lined with other O-rings similar to the O-ring 50 so that additional securing and griping forces may be may applied to keep out dust, grit, sand, water by compressive sealing of opposing surfaces into the O-rings. Materials used in the construction of the casings in alternate embodiment for the pen and cap sections 20 and 100 may be configured to meet Mil Standard 810F in which the stowed state of the rugged digital pen 10 as in FIG. 5B would tolerate submersion in up to 2 meters fresh or salt water and have plastic casings that are fungus resistant and able to withstand exposure to corrosive organic solvents. In other alternate embodiments of the cap sections 20 and 100 configured to wireless operate will operate under those Mil Standards concerned with minimizing electromagnetic interference, for example MIL-STD-461E.

Figure 6A:
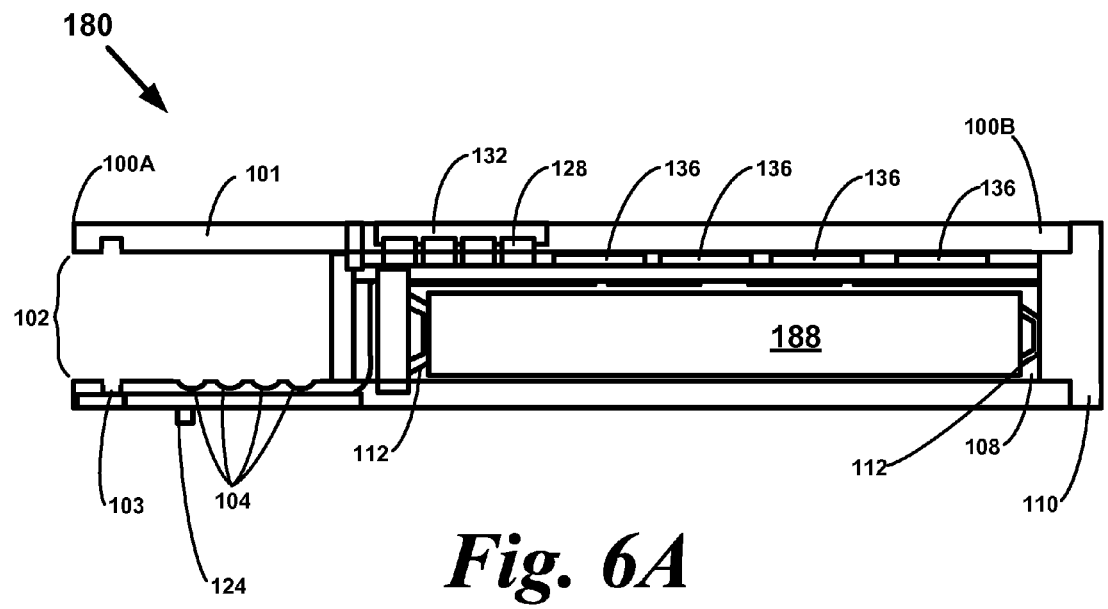
FIG. 6A schematically illustrates in cross-section an alternate embodiment of the cap section.

FIG. 6A schematically illustrates in cross-section an alternate embodiment 180 of the cap section. The cap section 180 includes a larger capacity battery 188 that occupies the space previously occupied by the spare ink pens 26, now removed from the cap section 180.

Figure 6B:
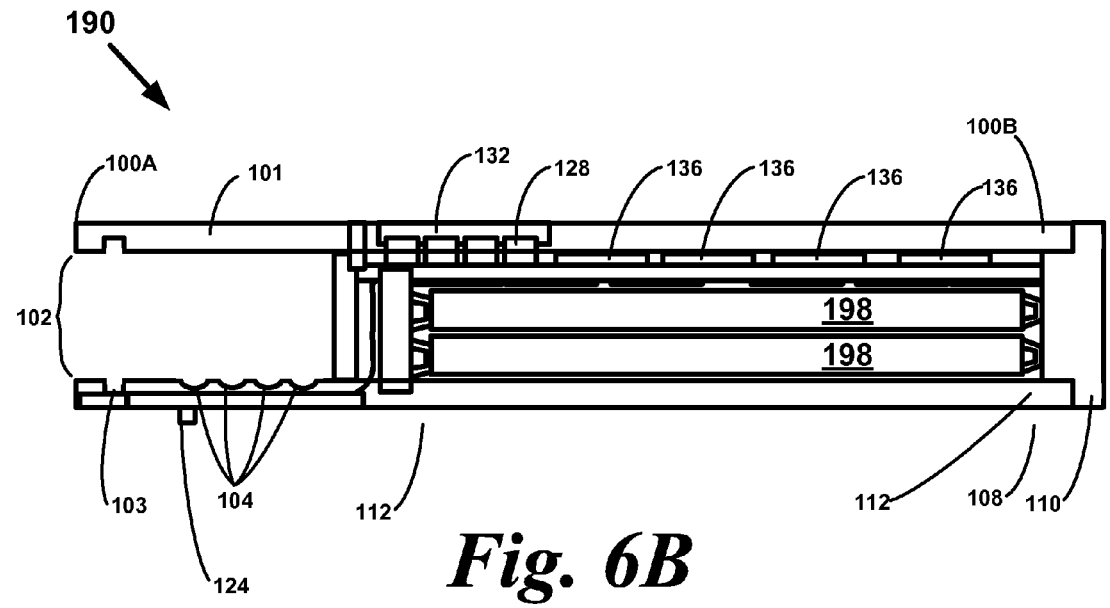
FIG. 6B schematically illustrates in cross-section another alternate embodiment of the cap section.

FIG. 6B schematically illustrates in cross-section another alternate embodiment 190 of the cap section. The cap section 190 includes a contacts to engage with multiple batteries to develop a larger effective power source. As illustrated, two batteries 198 are adjacent to each other in parallel connection to accommodate a greater power capacity at approximately the same voltage. The spare ink pens are removed from the cap section 190.

Figure 7:
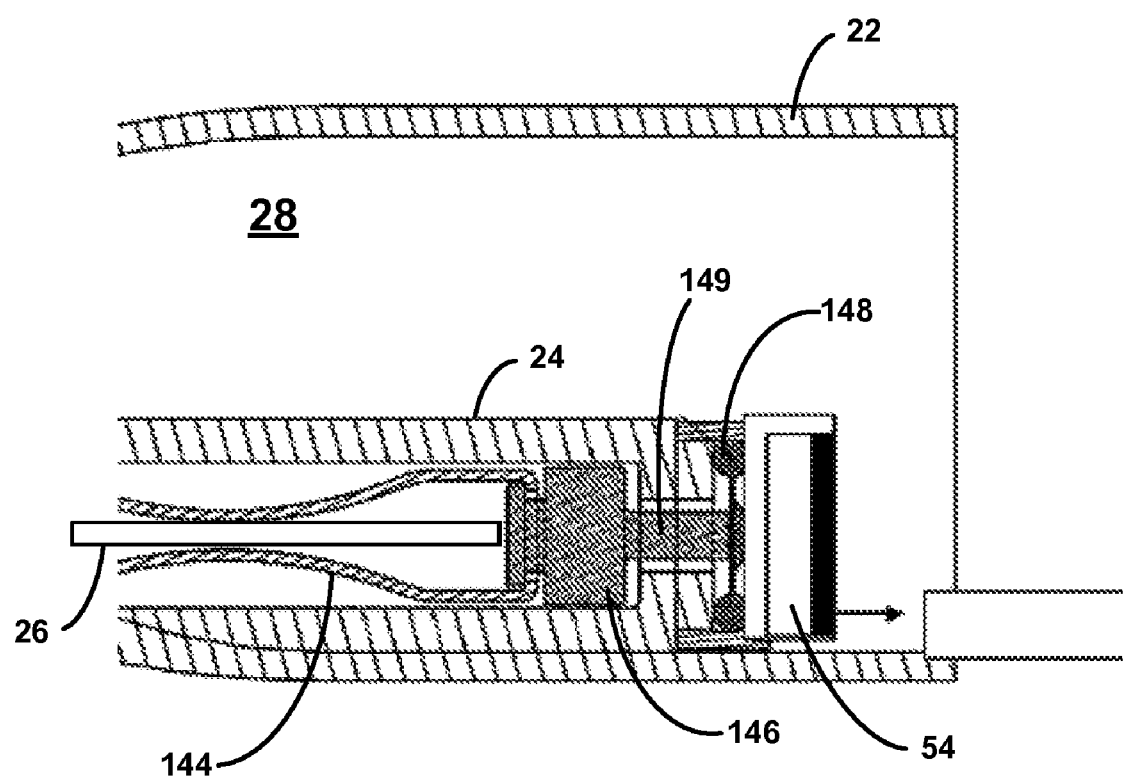
FIG. 7 schematically illustrates in cross-section portions of the sealed ink cartridge container.

FIG. 7 schematically illustrates in cross-section portions of the sealed ink cartridge container. A rearward portion of the cartridge 26 is shown within the pen cavity 28 and engages with the pressure switch 54 via plunger mechanism 146. The cartridge 26 is secured by clip 144. Interposed between the plunger mechanism 146 and pressure switch 54 is a flexible pressure membrane transducer 148 and membrane extension 149 that outputs stepped electrical signals in multiple increments to include at least two, and in other embodiments, four and eight or more levels in proportion to the force experienced by the ink pen 26. Analog to digital conversion (ADC) circuitry (not shown) connected with the membrane transducer 148 transforms the incremental analog signals to discrete digital form. Software having computer executable code measures and sorts the discrete digital signals and classifies them according to the force exerted onto the ink pen 26. The force-classified discrete digital signals provides a basis for the digital pen to interpret line width and other illustration characteristics according to the force experienced by the ink pen 26. Timing between force spurts also permits interpreting or defining mouse-like functions to the pen assembly 10, or the pen bodies 200 and 220 described below.

Figure 8:
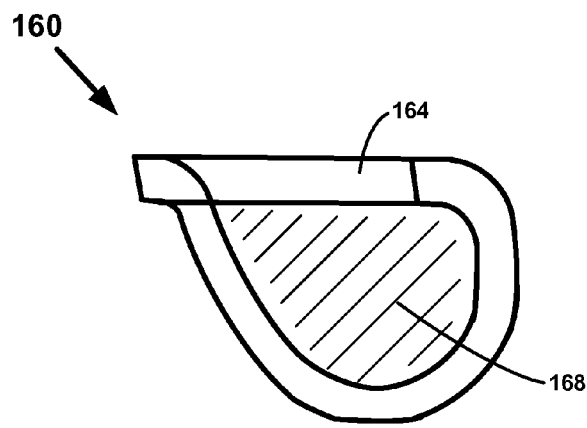
FIG. 8 depicts a user-replaceable cover for the IR filter.

FIG. 8 depicts a user-replaceable cover 160 for the IR filter 30. The cover 140 includes an elastic perimeter 164 around an IR transparent surface 168. The cover 160 keeps dust and water from reaching scratch sensitive optical surfaces of the filter 30.

Figure 9:
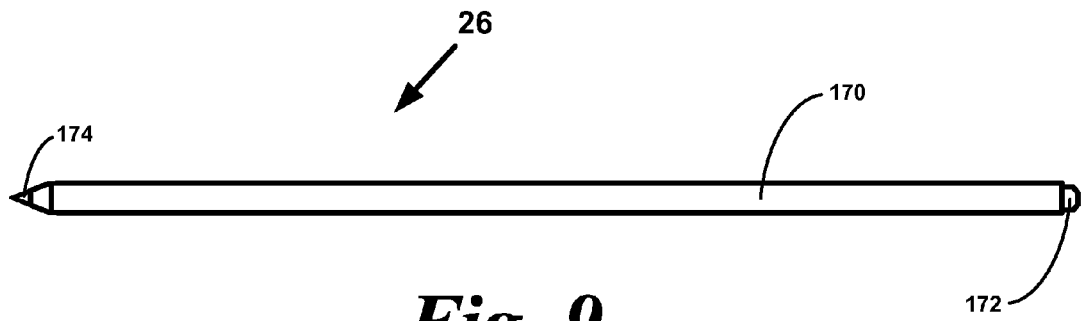
FIG. 9 depicts another embodiment of the sealed ink cartridge container.

FIG. 9 depicts in cross section the sealed ink cartridge container 26. The cartridge 26 includes an ink reservoir 170 sealed by plug 172 that is fluid coupled with an ink roller 174.

With respect to the above description the dimensional relationships for the pen section 20 and cap section 100 may vary size, material type, shape, and form to accommodate functional and manner of operation during use and stowage.

FIG. 10A schematically illustrates in partial cross-section a unitary digital pen 200. The unitary digital pen 200 is includes the pen section 20 and cap section 100 illustrated in FIGS. 2 and 3 being non-detachably fused together in a pen body 202. The pen body 200 includes the combined features of the pen 20 and cap section 100 of which some are illustrated, including the filter 30, the LED window 132, battery cap 110 and a portion of the sealed ink cartridge 26. Detachably engagable with the digital pen body 202 is a pen cover 212. The pen body 202 also includes a slot 206 and a Hall switch 216. Within the pen cover 212 includes an O-ring 215 and a magnet 218.

The operation of the unitary digital pen 200 begins by removing the pen cover 212 from the pen body 202 that disengages the magnet 218 from the hall switch 216, creating a voltage that triggers the pen body 202 to activate to operational status. Slipping the pen cover 212 over the pen portion of the pen body 202 places the magnet 218 closely adjacent to the hall switch 216 to create a voltage that triggers the body 202 to a non-operational or stowed status. The cover 212's O-ring 215 sealably seats in the slot 206 of the pen body 202 to prevent water intrusion into the internal regions of the pen body 202 and pen cover 212 from rain or water submission up to approximately ten feet.

Figure 10B:
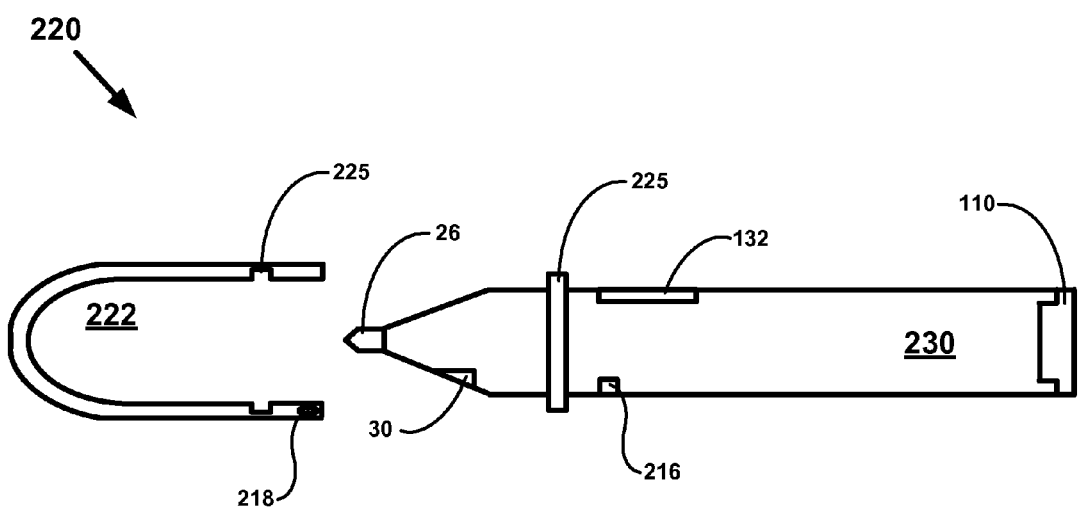
FIG. 10B schematically illustrates in partial cross-section another alternate embodiment of the digital pen.

FIG. 10B schematically illustrates in partial cross-section another unitary embodiment 220 of the digital pen. Substantially similar to the unitary digital pen 200, the digital pen 220 includes a slot 225 located in a pen cover 222 and an O-Ring 235 located on the pen body 230.

The operation of the unitary digital pen 220 begins by removing the pen cover 222 from the pen body 230 that disengages the magnet 218 from the hall switch 216, creating a voltage that triggers the pen body 230 to activate to operational status. Slipping the pen cover 222 over the pen portion of the pen body 230 places the magnet 218 closely adjacent to the hall switch 216 to create a voltage that triggers the body 230 to a non-operational or stowed status. The pen body 230's O-ring 225 sealably seats in the slot 235 of the pen cover 222 to prevent water intrusion into the internal regions of the pen body 230 and pen cover 222 from rain or water submission up to approximately ten feet.

Figure 11:
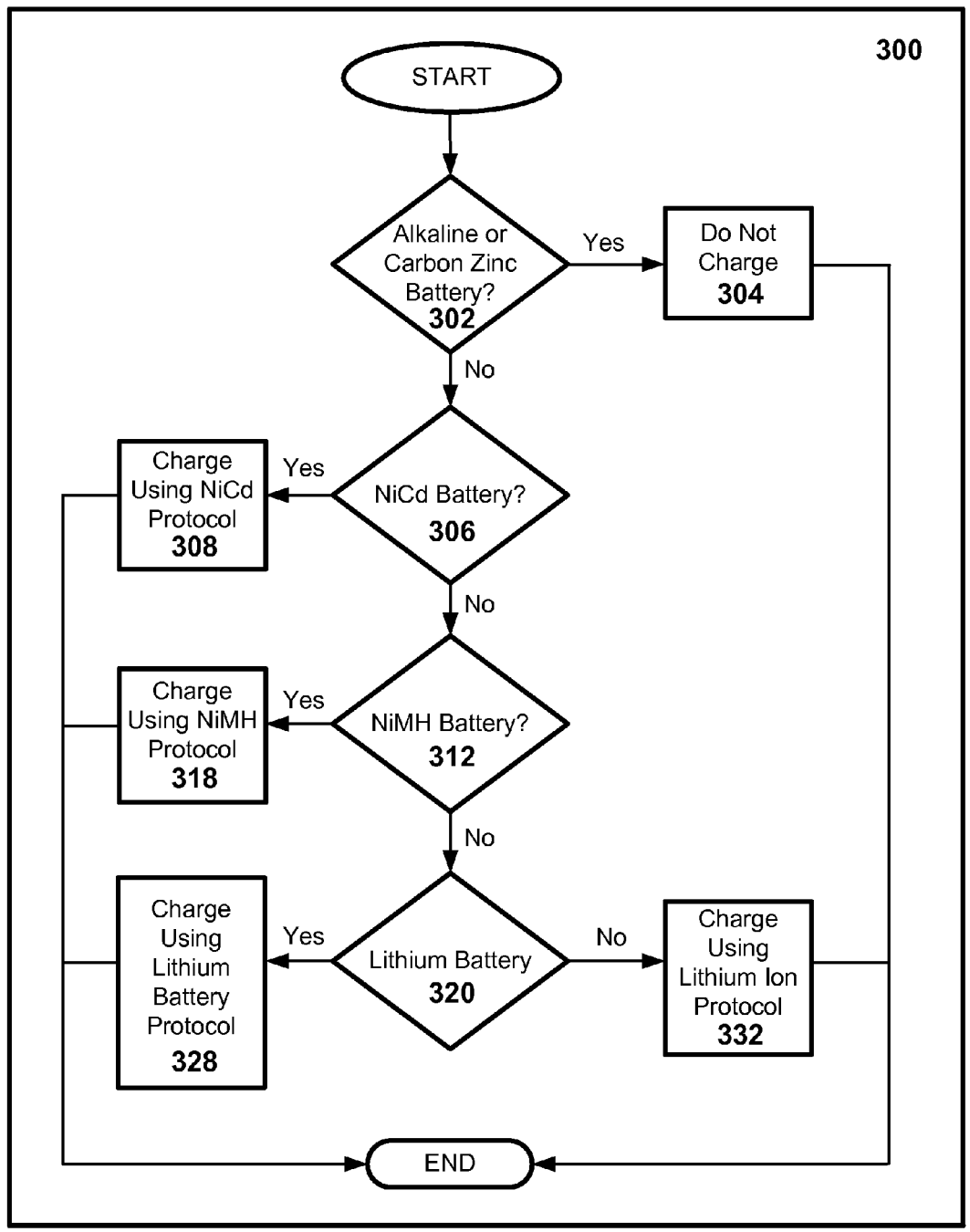
FIG. 11 illustrates a battery charging decision algorithm.

FIG. 11 illustrates a battery charging algorithm 300. Algorithm 300 decides whether a non-chargeable or chargeable battery is inserted into the cap section 100, the pen body 202, and the pen body 230, and if chargeable, what type of rechargeable battery and which protocols to invoke for charging. Beginning with decision diamond 202 with the query, "Carbon or alkaline battery?", the charging algorithm 300 splits to an affirmative branch and a negative branch. If affirmative for carbon zinc and/or alkaline batteries, algorithm routes to processing block 304, do not charge, and algorithm 300 is completed. If negative, algorithm 300 proceeds to decision tree for rechargeable batteries, beginning with decision diamond 306 with query "NiCad battery?" If affirmative for nickel cadmium battery, then algorithm 300 routes to processing block 308, charge using NiCd protocol and algorithm 300 is completed. If negative, algorithm 300 proceeds to decision diamond 312 with query "NiMH battery?" If affirmative for nickel metal hydride battery, then algorithm 300 routes to processing block 318, charge using NiMH protocol and algorithm 300 is completed. If negative, algorithm 300 proceeds to decision diamond 320 with query "Lithium battery?" If affirmative for Lithium battery, then algorithm 300 routes to processing block 328, charge using Lithium battery protocol and algorithm 300 is completed. If negative for Lithium battery, then algorithm 300 routes to processing block 328, charge using Lithium Ion battery and algorithm 300 is completed.

Figure 12:
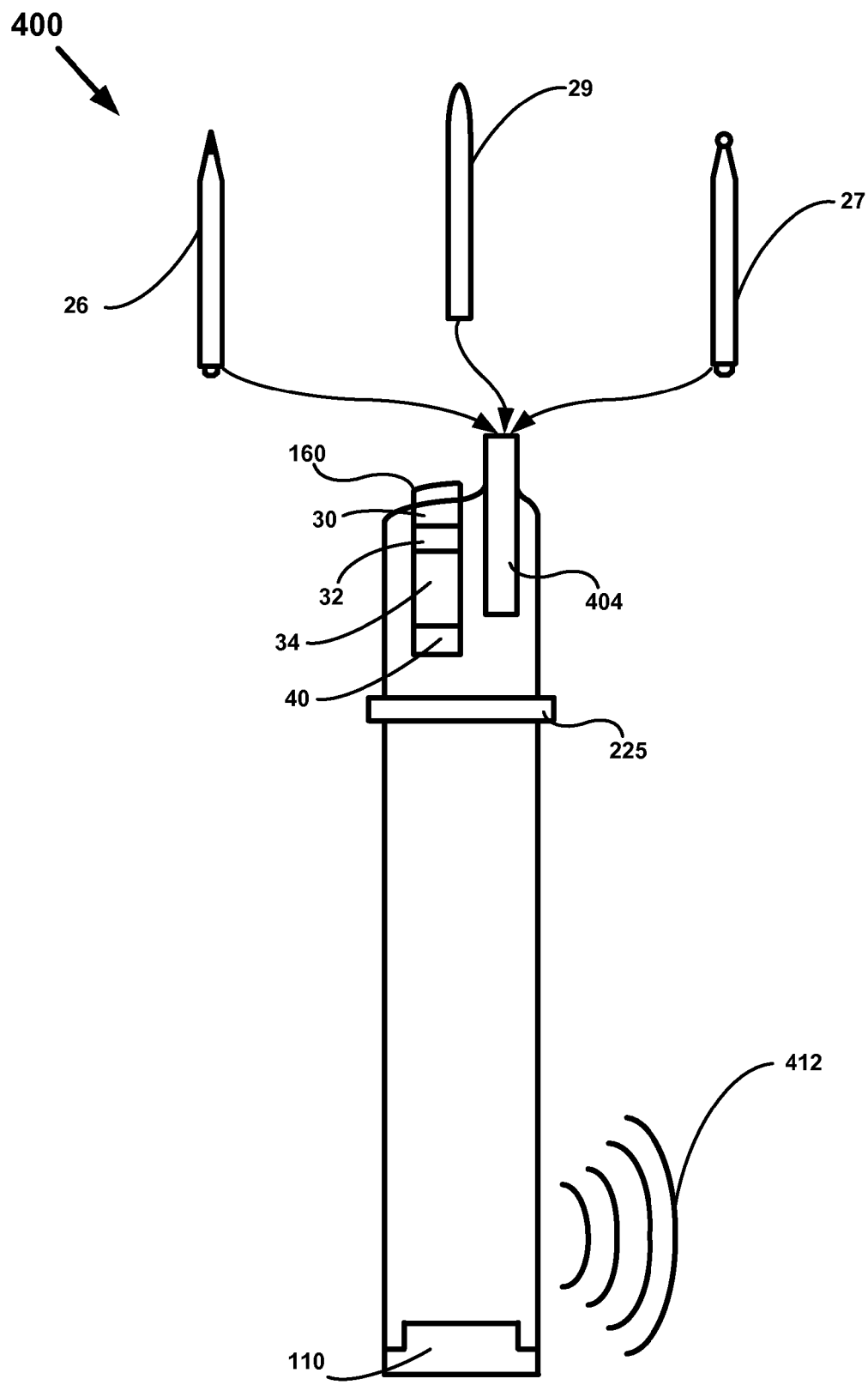
FIG. 12 schematically illustrates in partial cross-section an alternate embodiment 400 of the digital pen illustrated in FIG. 10B.

FIG. 12 schematically illustrates in partial cross-section an alternate embodiment 400 of the digital pen illustrated in FIG. 10B. The digital pen 400 includes a stylus chamber 404 configured to securely hold yet provide adequate play for receiving detachably insertable stylus and ink containing pens. The detachably insertable pens include the fabric marker and sealed pen cartridge 26, a roller ball sealed pen cartridge 27, and a stylus 29 having a pointed end. The stylus chamber 404 receives the pen cartridges 26 and 27 and stylus 29 without allowing the passage of water, grit, sand, or other abrasives into the internal regions of the pen 400. Substantially parallel with the stylus chamber 404 is the optics channel 34 having the lens 32, and optics window 30. Sealably engaged and protecting the surface of the optics window 30 is the light transparent window shield 160. Within the internal regions of the digital pen 400 resides a transmitter (not shown) that radiates radio or other electromagnetic waves 412 capable of reception by a radio receiver (not shown) in communication with a computer system (not shown). Waves other than electromagnetic may be used as a form of wireless communication, including infrared, visible, ultraviolet, and ultrasonic sound waves. Ports for wired communication to the computer system (not shown) may be substituted for the wireless waves 412. A pen cap substantially similar to the cap 222 of FIG. 10B may sealably and securely engage with the O-ring 225 to impart a ruggedness that augments environmental survivability, including submersion to approximately 2 meters depth in fresh and/or salt water.

FIGS. 13A-C schematically illustrates in cross-section details of the stylus chamber 404 of digital pen 400 of FIG. 13.

FIG. 13A illustrates the stylus 29 inserted into the stylus chamber 404 and held against the plunger mechanism 146 by clips 144. Along the perimeter of the plunger mechanism 146 is a gap 416 that gives enough horizontal and vertical play to the stylus 29 (approximately in the direction of the horizontal and vertical directed double headed arrows). Near the orifice of the stylus chamber 404 is a latex or rubber annular ring 408. Vertical play available to the stylus 29 is conferred by the compressible distances available to the rubbery or latex annular ring 408 that holds, but does not rigidly restrict the vertical or other side play to the stylus 29, including substantially in the horizontal or axial direction of the stylus 29. Horizontal movement experienced by the stylus 29 is conveyed to the plunger mechanism 146 that is relayed to the flexible pressure membrane transducer 148 via a membrane extension 149. Enveloping the chamber 404 is a barrier wall 406 that is sufficiently thick and whose chamber directed surface is sealably integral to effectively prevent the passage of water, sand, and other abrasives into the internal region of the digital pen 400.

The horizontal movement experienced by the stylus 29 is mechanically transferred to the flexible transducer 148 up to the limits of the gap 416 surrounding the plunger mechanism 146. The incremental portions of the distance of the gap 416 available to accommodate the horizontal play of the stylus 29 in turn affect the incremental signal outputs from the flexible transducer 148. That is, the distance of the gap 416 available to accommodate the horizontal movement play of the stylus 29 imposed upon the plunger mechanism 146 is proportioned to the incremental 2-4-8 or other output of the flexible transducer 148. Differences in digital line thickness or simulations of mouse click commands like mechanism may be assigned to the incremental outputs resulting from the differential forces pressed upon the stylus 29 though use of the digital pen 400. The differential forces are conveyed to the flexible transducer 148 as mechanically transferred through the plunger mechanism 146 and membrane extension 149. Incremental signals from the flexible transducer 148 are proportionately conveyed either as stepped analog or digital signals, are eventually communicated within the wireless signal 412. Upon reception by the receiver (not shown) of the wireless signal 412 and presented on a computer display connected with the receiver (not shown), a "Digital ink" appearance may be conveyed to the movement of the digital pen 400 as captured by optics and camera 40 to the visual content contained in the captured images of the moving pen 400. Besides varying the digital ink appearance to lines sketched by the digital pen 400, mouse click equivalent commands are similarly presented or otherwise annotated on the computer display.

FIG. 13B illustrates the sealed pen 29 inserted into the stylus chamber 404 and held against the plunger mechanism 146 by clips 144. Similarly operating to the stylus 29, the sealed pen 29 provides a written feedback to surfaces that the pen contacts with, including patterned digital papers and un-patterned surfaces. Variations in line thicknesses conveyed onto the digital papers or un-patterned surfaces are similar conveyed as digital ink onto the display of computer systems via wireless signals 412.

FIG. 13C illustrates the sealed roller pen 29 inserted into the stylus chamber 404 and held against the plunger mechanism 146 by clips 144. Similarly operating to the felt-tip pen 26, the sealed roller-ball pen 27 provides a written feedback to surfaces that the pen contacts with, including patterned digital papers and un-patterned surfaces. Variations in line thicknesses conveyed onto the digital papers or un-patterned surfaces are similar conveyed as digital ink onto the display of computer systems via wireless signals 412.

While embodiments of the present invention have been illustrated and described, it is understood that changes may be made without departing from the spirit and scope of the invention. For example, mechanical connection between the pen section 20 and cap section 100 to establish single and/or two-way signal communication may be achieved by wireless circuitry. Accordingly, the scope of the invention is not limited by the disclosure of the particular embodiments. Instead, the invention is to be determined entirely by reference to the claims that follow.

The invention claimed is:

1. A digital writing device comprising:

a pen section having a writing portion and a cap engagement portion with a plurality of cap engagement members, the writing portion having an ink distribution device and an optics channel configured to transmit light toward a digitally-enabled writing surface, the cap engagement portion having a camera in optical communication with the optics channel for receiving light from the writing surface through the optics channel;

a cap section engageable with the pen section, the cap section having a circuit receiving portion with electronic circuitry for receiving signals from the camera for processing information from the pen section, the cap section further having a pen engagement portion with a plurality of pen engagement members complementarily configured to releasably engage the cap engagement members of the pen section; and a sealing mechanism coupled to at least one of the pen or cap sections and engageable with the other of the pen or cap sections, the sealing mechanism configured to substantially prevent liquids and particulates from entering the cap section, wherein the cap engagement members and the pen engagement members are sealably engageable when the pen section is in a writing configuration and sealably engageable when in a stowed configuration, the writing configuration having the ink distribution device facing away from the circuit receiving portion and the stowed configuration having the ink distribution device facing toward the circuit receiving portion.

2. The digital writing device of claim 1, wherein the digitally-enabled writing surface includes a pattern of printed dots.

3. The digital writing device of claim 1, wherein the camera includes a charge coupled device for receiving light from the digitally-enabled writing surface.

4. The digital writing device of claim 1, further comprising an o-ring secured to the pen section and receivable in a slot provided in the cap section for sealably engaging the pen section with the cap section.

5. The digital writing device of claim 1, wherein the cap engagement members and the pen engagement members are in electrical communication to activate the digital writing device when in the writing configuration and deactivate the digital writing device when in the stowed configuration.

6. A digital pen comprising:

a pen section having a writing portion and a cap engagement portion, the writing portion having an ink distribution device and an optics channel configured to transmit light toward a digitally-enabled writing surface, the cap engagement portion having a camera in optical communication with the optics channel for receiving light from the writing surface through the optics channel;

a cap section engageable with the pen section, the cap section having a circuit receiving portion with electronic circuitry for receiving signals from the camera for processing information from the pen section; and a sealing mechanism coupled to at least one of the pen or cap sections and engageable with the other of the pen or cap sections, the sealing mechanism configured to prevent a liquid from entering the cap section during an immersion event, wherein the pen section is reversibly engageable with the cap section to be in one of a writing configuration and a stowed configuration, the writing configuration having the ink distribution device facing away from the circuit receiving portion and the stowed configuration having the ink distribution device facing toward the circuit receiving portion.

7. The digital computer pen of claim 6, wherein the pen section further includes a light-transmitting shield.

8. The digital pen of claim 6, wherein the pen section and the cap section are made from durable materials.

9. The digital pen of claim 6, wherein an exterior surface of the cap section is at least partially covered with a grippable material.

* * * * *